(12) United States Patent
Calabro

(10) Patent No.: US 7,743,601 B2
(45) Date of Patent: Jun. 29, 2010

(54) RESISTOJET

(75) Inventor: Max Calabro, Villennes sur Seine (FR)

(73) Assignee: Astrium SAS, Paris (FR)

( * ) Notice: Subject to any disclaimer, the term of this patent is extended or adjusted under 35 U.S.C. 154(b) by 720 days.

(21) Appl. No.: 11/575,982

(22) PCT Filed: Oct. 13, 2005

(86) PCT No.: PCT/FR2005/050848

§ 371 (c)(1), (2), (4) Date: Mar. 26, 2007

(87) PCT Pub. No.: WO2006/056710

PCT Pub. Date: Jun. 1, 2006

(65) Prior Publication Data

US 2007/0295009 A1  Dec. 27, 2007

(30) Foreign Application Priority Data

Oct. 15, 2004  (FR) .................................. 04 10916

(51) Int. Cl.
*F03H 1/00* (2006.01)

(52) U.S. Cl. .................................... 60/203.1; 60/200.1

(58) Field of Classification Search ................ 60/200.1, 60/203.1
See application file for complete search history.

(56) References Cited

U.S. PATENT DOCUMENTS

| 3,152,774 | A  |     | 10/1964 | Wyatt |
| 3,210,927 | A  | *  | 10/1965 | Brinich et al. ................ 60/266 |
| 4,322,946 | A  | *  | 4/1982  | Murch et al. ............... 60/203.1 |
| 4,577,461 | A  | *  | 3/1986  | Cann ......................... 60/203.1 |
| 4,608,821 | A  | *  | 9/1986  | Zavesky et al. ............ 60/203.1 |
| 4,825,647 | A  | *  | 5/1989  | Cann ......................... 60/203.1 |
| 4,907,407 | A  | *  | 3/1990  | Simon et al. ............... 60/203.1 |
| 4,995,231 | A  | *  | 2/1991  | Smith et al. ................ 60/203.1 |
| 5,076,051 | A  | *  | 12/1991 | Naff .......................... 60/203.1 |
| 5,947,421 | A  | *  | 9/1999  | Beattie et al. ............ 244/171.1 |
| 5,954,298 | A  |     | 9/1999  | Basuthakur et al. |
| 6,029,438 | A  | *  | 2/2000  | Hosick ........................ 60/202 |
| 6,205,378 | B1 | *  | 3/2001  | Rodden et al. ................ 701/13 |
| 6,421,998 | B1 | *  | 7/2002  | Frye et al. ................. 60/203.1 |
| 6,484,973 | B1 | *  | 11/2002 | Scott ....................... 244/172.5 |
| 2002/0170284 | A1 | * | 11/2002 | Frye et al. ..................... 60/204 |
| 2003/0098394 | A1 | * | 5/2003  | Cooper ........................ 244/166 |
| 2004/0045276 | A1 | * | 3/2004  | Frye et al. ................. 60/203.1 |
| 2004/0149861 | A1 |    | 8/2004  | Strobl et al. |

FOREIGN PATENT DOCUMENTS

DE  197 29 471  1/1999

* cited by examiner

*Primary Examiner*—William H Rodriguez
(74) *Attorney, Agent, or Firm*—Oblon, Spivak, McClelland, Maier & Neustadt, L.L.P.

(57) ABSTRACT

The invention concerns an electrothermal thruster (1) comprising a heating section (20) through which a propellant fluid (4) is intended to pass so that it is heated before it is exhausted, the heating section (20) being supplied by an electric power source (22). According to the invention, the electric power source (22) comprises photovoltaic cells (24) mounted on the heat exchanger (10) through which the propellant fluid (4) is intended to pass before it reaches the heating section (20).

Application to the area of spacecraft propulsion.

7 Claims, 1 Drawing Sheet

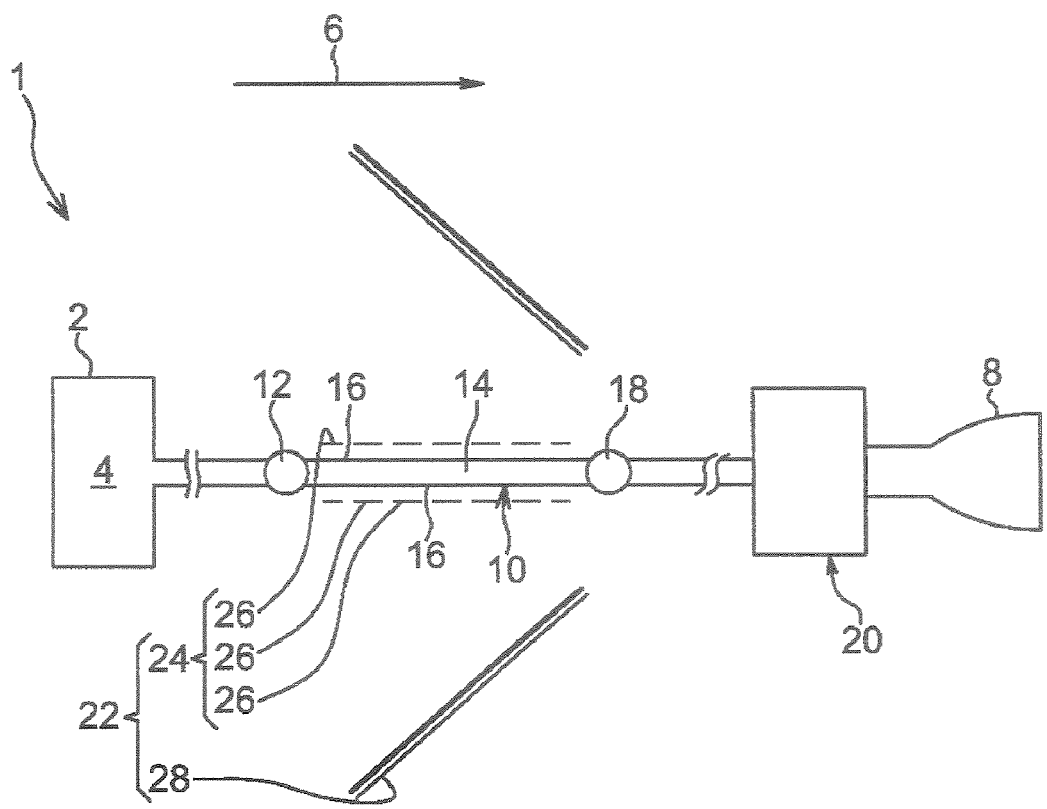
SINGLE FIGURE

RESISTOJET

TECHNICAL AREA

The present invention generally pertains to an electrothermal thruster comprising, in known manner an electrically powered heating section intended to heat a propellant fluid in order to increase its exhaust velocity.

The invention finds particular application in the area of propulsion systems for spacecraft, such as space transfer modules, but is in no way limited to this application however.

PRIOR ART

As indicated above, known electrothermal thrusters (resistojet, arcjet) use electricity to heat a propellant fluid such as hydrogen, ammonia or any other suitable fluid, to obtain a heated compressed propellant fluid ensuring its increased exhaust velocity.

Electrothermal thrusters of resistojet and arcjet type are known in the prior art, the former having a heating section using a heating filament through which the propellant passes, while the latter type is provided with a hearing section which heats the propellant fluid by passing it through a current arc.

In both cases, the on-board source of electric power supplying the heating section is generally complex, usually responsible for a low global yield of the electrothermal thruster assembly.

OBJECT OF THE INVENTION

The purpose of the invention is therefore to propose an electrothermal thruster whose design provides it with an improved global yield as compared with the yield of prior art embodiments.

For this purpose, the object of the invention is an electrothermal thruster comprising a heating section supplied with an electric power source, through which a propellant fluid is intended to pass so that this propellant can be heated before being discharged. According to the inventions, this electric power source comprises photovoltaic cells mounted on a heat exchanger through which the propellant fluid passes before it reaches the heating section.

Advantageously, in the electrothermal thruster of the invention, the heat exchanger associated with the photovoltaic cells enables the heating of the cells to be contained, and hence ensures a satisfactory yield of these same photovoltaic cells by regenerating heat losses. Therefore, this possible extensive limiting of cell heating allows the use of small photovoltaic cell surfaces on which sun radiation can be concentrated, e.g. using mirrors, without however generating any decrease in the yield of these cells. This can evidently be explained by the fact that solar cells output a current that is proportional to input flow with no yield loss, and up to very high concentration rates for as long as their temperature is maintained below a maximum service temperature.

Additionally, the possible limiting of lowered cell yield also allows the optional use of photovoltaic cells of low-cost technology.

Also, since the propellant fluid circulating inside the heat exchange is the same as the propellant intended to pass through the heating section before being discharged from the thruster, it can be understood that this same propellant fluid is therefore advantageously preheated by the exchange before arriving in the heating section, also called a <<chamber>>.

Therefore, in the light of the above, it can easily be understood that the global yield of the electrothermal thruster can be substantially improved as compared with the yield of prior art embodiments.

Also, whether the thruster of the invention is of resistojet or arcjet type, the global yield obtained can be identical or similar to that observed without this thrusters known in the prior art, without this thruster requiring a costly, complex assembly of receiver-exchanger-accumulator type, whose technology is relatively ill-mastered.

As mentioned above, to obtain electric power adapted to the electricity needs of the heating section, it is preferable that the electric power source also comprises a solar concentrator of mirror type preferably being in the form of an inflatable structure.

Preferably, the photovoltaic cells are mounted on the outer surface of this heat exchanger, preferably by bonding.

Other advantages and characteristics of the invention will become apparent from the non-limiting description given below.

BRIEF DESCRIPTION OF THE DRAWINGS

This description will be made with reference to the single FIGURE showing a schematic side view of an electrothermal thruster according to a preferred embodiment of the invention.

DETAILED DESCRIPTION OF A PREFERRED EMBODIMENT

With reference to the single FIGURE, an electrothermal thruster 1 is schematically illustrated, according to a preferred embodiment of the invention, this thruster 1 indifferently being of resistojet or arcjet type.

The thruster 1 firstly comprises a tank 2 of propellant fluid or propergol 4, this propellant fluid being intended to pass through the thruster assembly 1 in a main direction of flow of the propellant fluid represented by arrow 6, until it is discharged from the exhaust nozzle 8 forming the downstream end of the thruster 1.

The tank 2 is connected downstream to a heat exchanger 10, and more precisely to an upstream collector 12 that is part thereof and intended to direct the propellant fluid 4 in the direction of a central exchanger portion 14 of this exchanger 10. In this respect, it is to be noted that the heat exchanger 10 can in fact be formed of two reverse exchangers in order to achieve maximum homogenization of the temperature of the outer surface 16 of the central exchanger portion 14. This central exchanger portion 14 is preferably made in a material with variable stitch spacing, whether or not including a layer of highly conductive material to homogenize the temperature seen by the photovoltaic cells which, as will be described in more detail below, are mounted on the outer surface 16. By way of illustrative example the central exchanger portion 14 is fabricated in the manner described in document FR-A-2 836 690.

This central exchanger portion 14 is connected to a downstream collector 18 of the exchanger 10, this downstream collector 18 itself being connected to a hearing section 20 of the thruster whose design, well known to those skilled in the art, is dependent on the type of thruster under consideration (resistojet/arcjet).

The propellant fluid 4, such as hydrogen, ammonia or other, therefore leaves the downstream collector 18 to enter into the heating section 20, before being removed from the latter to arrive at the exhaust nozzle 8 from which it is discharged from the thruster 1 at a very high speed.

One of the particularities of the invention lies in the fact that an on-board electric power source supplying the heating section 20 comprises photovoltaic cells 24 mounted on the outer surface 16 of the central exchanger portion 14 of the exchanger 10.

More precisely, the photovoltaic cells 24, called solar cells, are preferably arranged in a plurality of solar panels 26 or panels of solar cells bonded onto this outer surface 16, this latter surface preferably being planar, or in any other form which may be found in heat exchangers known to those skilled in the art. In this respect, it is specified that this heat exchanger is designed to maintain the outer surface 16 at a uniform temperature and below the maximum service temperature of the cells 24.

In association with the solar cells 24, the power source 22 also comprises a solar concentrator 28, preferably in the form of an inflatable structure with mirrors, optionally with Fresnel lenses. This type of solar concentrator 28, also known to those skilled in the art, is therefore arranged so as to reflect the light in the direction of the solar cells 24, and thereby to permit a significant increase in the solar flow captured by these same cells.

In this electrothermal thruster 1, it must therefore be understood that the propellant fluid 4 circulating through the central exchanger portion 14 of exchanger 10, ensures cooling of the solar cells 24 whose electric output is therefore increased at a constant yield, while this same propellant fluid 4 is then able to arrive at the input of the heating section 20 after it has already been preheated via the heat emitted by these solar cells 24.

Evidently, various modifications may be made by those skilled in the art to the electrothermal thruster 1 just described as a non-limiting example.

The invention claimed is:

1. An electrothermal thruster comprising:
 a heating section supplied by an electric power source and through which a propellant fluid is intended to pass to be heated before being exhausted,
 wherein said electric power source comprises photovoltaic cells mounted on a heat exchanger through which said propellant fluid is intended to pass before reaching said heating section.

2. An electrothermal thruster according to claim 1, wherein said electric power source further comprises a solar concentrator associated with said photovoltaic cells.

3. An electrothermal thruster according to claim 2, wherein said solar concentrator associated with said photovoltaic cells is an inflatable structure.

4. An electrothermal thruster according to claim 1, wherein said photovoltaic cells are mounted on an outer surface of said heat exchanger.

5. An electrothermal thruster according to claim 4, wherein said photovoltaic cells are mounted on the outer surface by bonding.

6. An electrothermal thruster according to claim 1, of resistojet type.

7. An electrothermal thruster according to claim 1, of arcjet type.

* * * * *